US009041701B2

(12) United States Patent
Yokota et al.

(10) Patent No.: US 9,041,701 B2

(45) Date of Patent: May 26, 2015

(54) ELECTRONIC APPARATUS, ELECTRONIC APPARATUS CONTROLLING METHOD, AND COMPUTER PROGRAM PRODUCT

(71) Applicant: Kabushiki Kaisha Toshiba, Tokyo (JP)

(72) Inventors: Ryuhei Yokota, Tokyo (JP); Yuuji Irimoto, Tokyo (JP); Hideaki Andou, Tokyo (JP); Tsukasa Nunami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 104 days.

(21) Appl. No.: 13/692,669

(22) Filed: Dec. 3, 2012

(65) Prior Publication Data

US 2013/0229399 A1 Sep. 5, 2013

(30) Foreign Application Priority Data

Mar. 2, 2012 (JP) ................................ 2012-047315

(51) Int. Cl.

*G06F 3/038* (2013.01)
*G09G 5/00* (2006.01)

(52) U.S. Cl.

CPC ............ *G09G 5/00* (2013.01); *G09G 2330/021* (2013.01); *G09G 2330/022* (2013.01); *G09G 2354/00* (2013.01)

(58) Field of Classification Search

USPC ........................................................ 345/211

See application file for complete search history.

(56) References Cited

U.S. PATENT DOCUMENTS

| | | | | |
|---|---|---|---|---|
| 2011/0135114 | A1* | 6/2011 | Oba et al. | 381/107 |
| 2011/0254691 | A1 | 10/2011 | Ooi et al. | |
| 2013/0132751 | A1* | 5/2013 | Liu et al. | 713/323 |

FOREIGN PATENT DOCUMENTS

| | | | |
|---|---|---|---|
| JP | 07-325639 | A | 12/1995 |
| JP | 11-242733 | A | 9/1999 |
| JP | 11-329758 | A | 11/1999 |
| JP | 2001-005550 | A | 1/2001 |
| JP | 2004-069533 | A | 3/2004 |
| JP | 2005-005805 | A | 1/2005 |
| JP | 2009-020663 | A | 1/2009 |
| JP | 2009-267644 | A | 11/2009 |
| JP | 2010-072794 | A | 4/2010 |
| JP | 2010-145765 | A | 7/2010 |
| JP | 2011-061300 | A | 3/2011 |
| JP | 2011-155578 | A | 8/2011 |

OTHER PUBLICATIONS

Decision to Grant a Patent mailed by Japan Patent Office on Jan. 22, 2013 on Jan. 22, 2013 in the corresponding Japanese patent application No. 2012-047315—5 pages.

Notice of Rejection mailed by Japan Patent Office on Jan. 7, 2014 in the corresponding Japanese patent application No. 2013-025477, which is a divisional application of JP 2012-047315—9 pages.

* cited by examiner

*Primary Examiner* — Robin Mishler

(74) *Attorney, Agent, or Firm* — Knobbe, Martens, Olson & Bear LLP

(57) ABSTRACT

According to one embodiment, an electronic apparatus includes: a presence determining module configured to determine at an interval whether a user is present based on image data output by a camera; a display power controller configured to turn on a display when the user is present and to turn off the display when the user is not present, based on a result of the presence determining module; and a detection interval controller configured to control the interval such that the interval is shorter when the display is off compared to when the display is on and the user is determined to be present.

5 Claims, 8 Drawing Sheets

FIG.3A

| POWER PLAN SETTING VALUE | SETTING VALUE (TIME) | |
|---|---|---|
| POWER PLAN SETTING VALUE TDIM OF BRIGHTNESS REDUCTION MODE | 2 MINUTES | (=TMIN) |
| POWER PLAN SETTING VALUE TOFF OF DISPLAY POWER OFF MODE | 10 MINUTES | |
| POWER PLAN SETTING VALUE TSLP OF INFORMATION PROCESSING DEVICE SLEEP MODE | 20 MINUTES | |
| POWER PLAN SETTING VALUE TSTP OF INFORMATION PROCESSING DEVICE HIBERNATION MODE | 30 MINUTES | |

FIG.3B

| POWER PLAN SETTING VALUE | SETTING VALUE (TIME) | |
|---|---|---|
| POWER PLAN SETTING VALUE TDIM OF BRIGHTNESS REDUCTION MODE | NO SETTING | |
| POWER PLAN SETTING VALUE TOFF OF DISPLAY POWER OFF MODE | NO SETTING | |
| POWER PLAN SETTING VALUE TSLP OF INFORMATION PROCESSING DEVICE SLEEP MODE | 25 MINUTES | (=TMIN) |
| POWER PLAN SETTING VALUE TSTP OF INFORMATION PROCESSING DEVICE HIBERNATION MODE | 50 MINUTES | |

TMIN≦1 min: TINT=45 sec 1 min<TMIN≦20 min: TINT=TMIN/2

20 min≦TMIN: TINT=10 min

ELECTRONIC APPARATUS, ELECTRONIC APPARATUS CONTROLLING METHOD, AND COMPUTER PROGRAM PRODUCT

CROSS-REFERENCE TO RELATED APPLICATIONS

This application is based upon and claims the benefit of priority from Japanese Patent Application No. 2012-047315, filed on Mar. 2, 2012, the entire contents of which are incorporated herein by reference.

FIELD

Embodiments described herein relate generally to an electronic apparatus, an electronic apparatus controlling method, and a computer program product.

BACKGROUND

Conventionally known is a technique for detecting a state in which a user is not using a display device such as a television or a display and turning off the display thereof to save electric power.

For example, Japanese Patent Application Laid-open No. 2011-061300 discloses a technique in which display of a television is turned off depending on a detection state of a face of a user captured by a capturing module so as to prevent the continuous display of the television when it is not viewed and thus achieve electric power saving.

In addition, Japanese Patent Application Laid-open No. 2010-145765 discloses a technique in which a camera captures an image to detect the fact that a user is not seated at a given position and the display of a display screen is then turned off.

When the configuration for constantly detecting a state of a user is adopted to enable rapid shifting to an electric power saving mode, it is required that means for capturing an image of a user is constantly operating, which makes it difficult to reduce electric power consumption.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIGS. 3A and 3B are exemplary explanatory diagrams illustrating examples of power plan setting values;

DETAILED DESCRIPTION

In general, according to one embodiment, an electronic apparatus comprises: a presence determining module configured to determine at an interval whether a user is present based on image data output by a camera; a display power controller configured to turn on a display when the user is present and to turnoff the display when the user is not present, based on a result of the presence determining module; and a detection interval controller configured to control the interval such that the interval is shorter when the display is off compared to when the display is on and the user is determined to be present.

Next, embodiments are described in detail with reference to the enclosed drawings.

Figure 1:
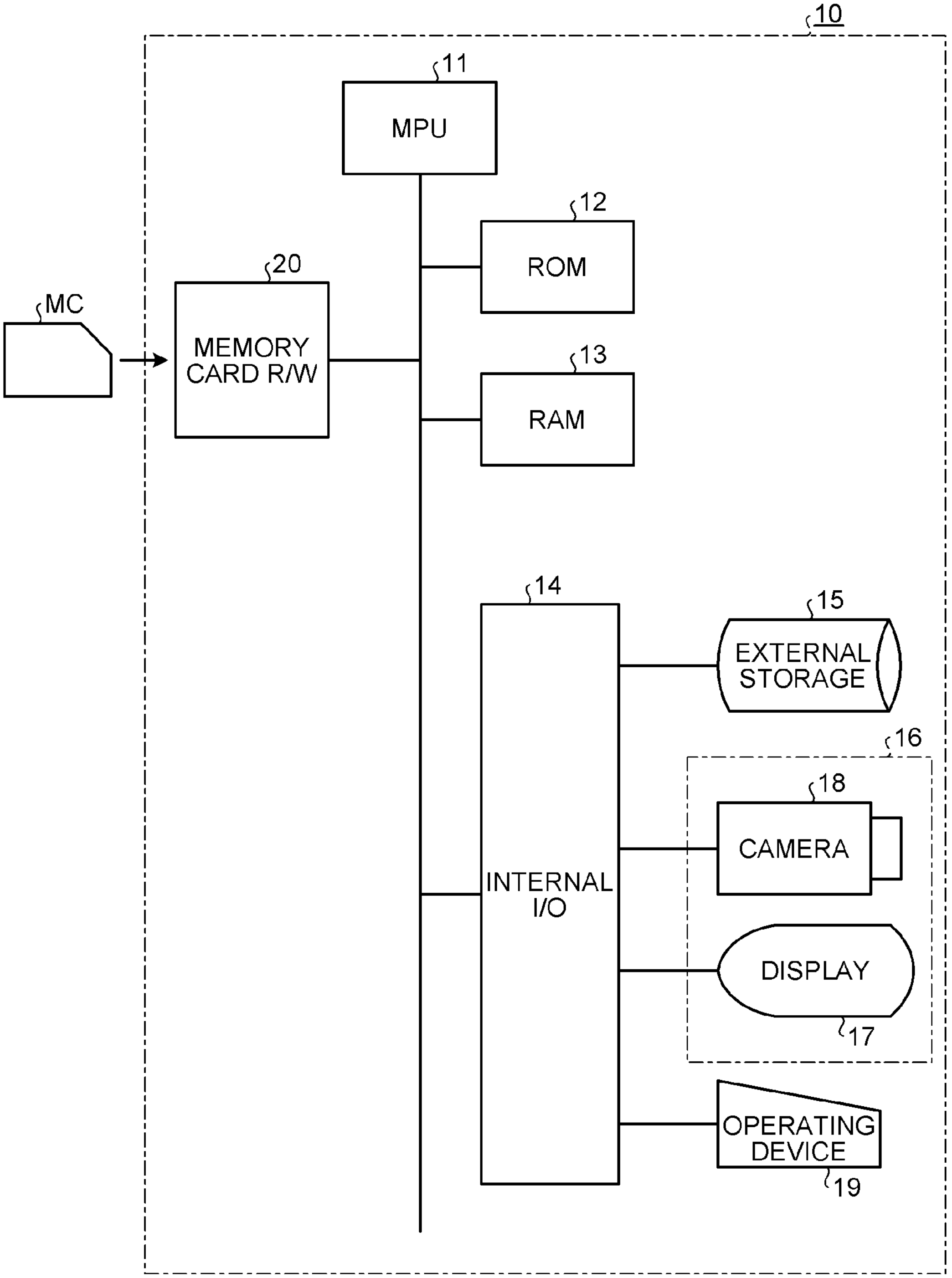
FIG. 1 is an exemplary block diagram illustrating a schematic configuration of an information processing device as an electric apparatus according to a first embodiment.

FIG. 1 is a block diagram illustrating a schematic configuration of an information processing device as an electric apparatus according to an embodiment.

An information processing device 10 in the first embodiment is constituted as a camera-equipped laptop personal computer (PC).

The information processing device 10 comprises an micro processing unit (MPU) 11 that controls the entire of the information processing device 10, a read only memory (ROM) 12 that stores, in a nonvolatile manner, a control program, etc. executed by the MPU 11, a random access memory (RAM) 13 that is used as a work area of the MPU 11 and temporarily stores various data, an internal input/output module (I/O) 14 that performs various kinds of interface operation, and an external storage 15 that is connected through the internal I/O 14 and constituted as a hard disk drive, a solid state disk (SSD), etc. storing therein various data.

In addition, the information processing device 10 comprises a display 17 constituted as a liquid crystal display, an electroluminescent (EL) display, etc. and a camera 18 as a camera device equipped with a charge-coupled device (CCD) image sensor or a complementary metal-oxide semiconductor (CMOS) image sensor, which are stored in a display panel portion 16, an operating device 19 constituted as a keyboard, a touch panel, a mouse, etc. so that a user perform various kinds of operation, and a memory card reader/writer (R/W) 20, to which a memory card MC as a recording medium is inserted, that reads/writes various data.

Next, the operation of the embodiment is described.

Figure 2:
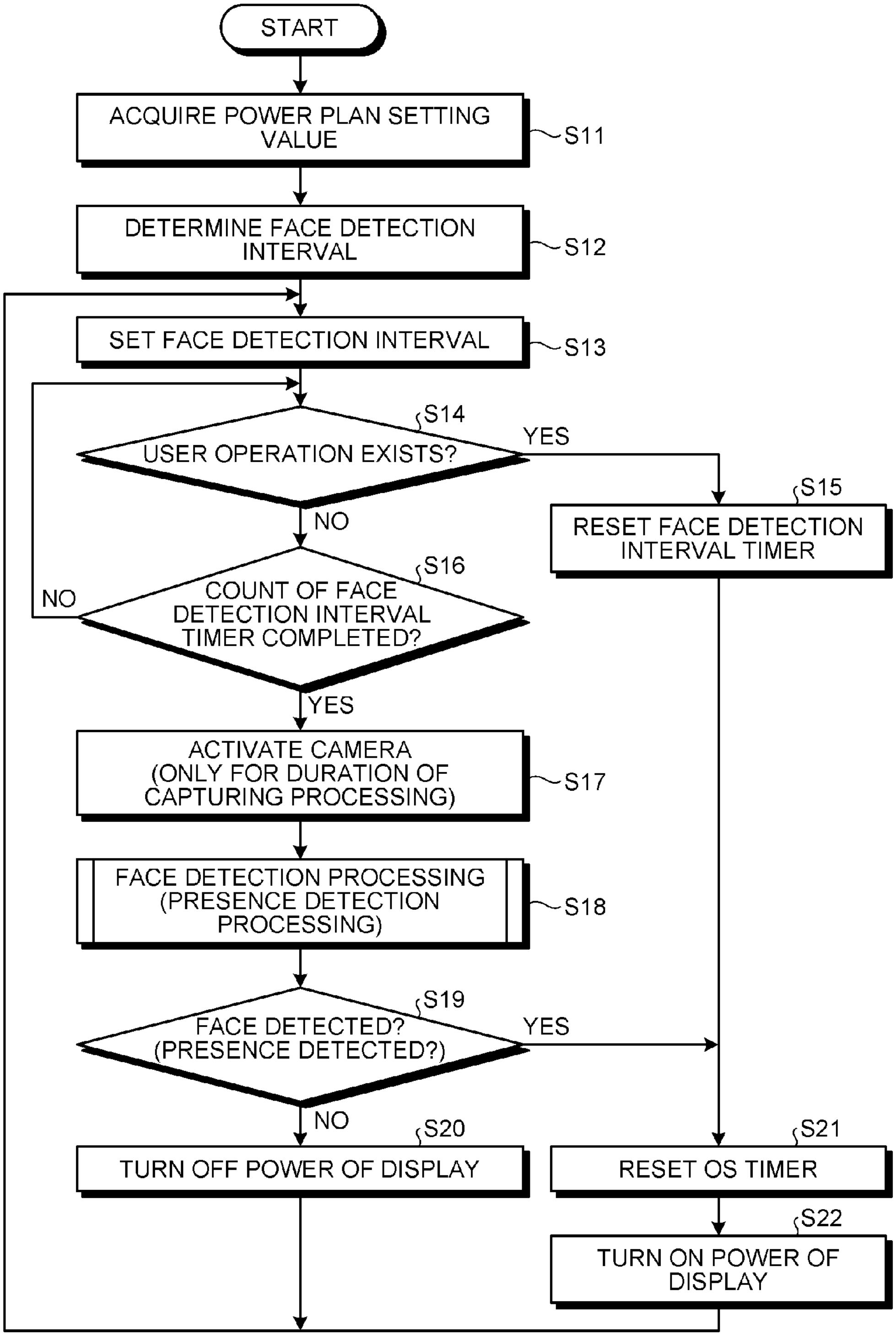
FIG. 2 is an exemplary flow chart illustrating operation processing in the first embodiment.

FIG. 2 is a flow chart illustrating operation processing in the first embodiment.

In this case, it is supposed that the power of the camera 18 is off and the power of the display is on in their initial states.

The MPU 11 of the information processing device 10 refers to power plan setting data of an operating system (OS) and acquires power plan setting values (S11).

Here, as a power plan setting value, an elapsed time (a reference elapsed time) in a successive non-operating state from the detection of a user's non-operating state in the information processing device 10 until the switching to a given electric power saving mode, is set.

In the embodiment, there are four kinds of power saving modes as follows.

(1) Display brightness reduction mode (2) Display power off mode (3) Information processing device (computer) sleep mode (4) Information processing device (computer) hibernation mode In the display brightness reduction mode, if the display is a liquid crystal display with a backlight, the light amount of the backlight is reduced to save electric power.

In the display power off mode, the power of the display is turned off and only standby mode electricity is maintained. In this mode, if the display is a liquid crystal display with a backlight, it is obvious that the backlight is totally turned off.

The information processing device sleep mode corresponds to the sleep state S3 of the advanced configuration and power interface (ACPI) standard that is one of the standards relating to electronic power control of personal computers. In this mode, the power of display functions or devices such as an external storage is turned off to reduce electric power consumption. However, the RAM is supplied with electric power to maintain active data without any change, and thus it is possible to restart from a state at which work is interrupted, unlike a case in which the power is turned off and on. Furthermore, recovery to the normal operation mode from the sleep mode of the information processing device is rapid, taking a few seconds.

Meanwhile, the information processing device hibernation mode corresponds to the sleep state S4 of the ACPI standard. In this mode, contents in the RAM 13 are saved in the external storage 15 such as a hard disk drive, and then the power of each of devices including the RAM 13 is turned off. Therefore, a data saving area for the hibernation mode whose capacity is approximately the same as of the RAM 13 is secured in a storage area of the external storage 15. Unlike the information processing device sleep mode, a state same as a case in which the power is totally off is provided.

However, shifting to the information processing device hibernation mode or recovery from the mode takes time because it is needed that contents of the RAM 13 are saved in the external storage 15 or read out therefrom.

Viewed from the device side, the information processing device sleep mode and the information processing device hibernation mode both correspond to a state nearly the same as power-off. Consequently, the device and the device driver need to be finished or initiated, which involves nearly the same process of shutdown for shifting to each state or activation (power-on) for recovery from each state.

FIGS. 3A and 3B are diagrams illustrating examples of power plan setting values.

In the embodiment, as illustrated in FIGS. 3A and 3B, there are four kinds of power plan setting values corresponding to the above-described kinds of electric power saving modes, respectively: power plan setting value TDIM of the display brightness reduction mode, power plan setting value TOFF of the display power off mode, power plan setting value TSLP of the information processing device (computer) sleep mode, and power plan setting value TSTP of the information processing device (computer) hibernation mode.

These power plan setting values are set in an operating system (OS) timer administrated by the MPU 11 under the main control of the operating system (OS), so that a operation mode shifts to a corresponding electric power saving mode at the time at which time respectively set as a power plan setting value has elapsed since operation by user is stopped. Note that in the following description, these power plan setting values are set in minutes.

Concrete setting example of power plan setting values is as illustrated in FIG. 3A: power plan setting value TDIM of the display brightness reduction mode=2 minutes, power plan setting value TOFF of the display power off mode=10 minutes, power plan setting value TSLP of the information processing device sleep mode=20 minutes, and power plan setting value TSTP of the information processing device hibernation mode=30 minutes.

Another concrete setting example of power plan setting values is as illustrated in FIG. 3B: no setting for power plan setting value TDIM of the display brightness reduction mode, no setting for power plan setting value TOFF of the display power off mode, power plan setting value TSLP of the information processing device (computer) sleep mode=25 minutes, and power plan setting value TSTP of the information processing device (computer) hibernation mode=50 minutes.

Then, the MPU 11 specifies, based on the power plan setting value TDIM, the power plan setting value TOFF, the power plan setting value TSLP, and the power plan setting value TSTP that are obtained at S11, a power plan setting value TMIN set as the shortest time among these power plan setting values to determine face detection interval time (S12).

To be more specific, in the example illustrated in FIG. 3A, the shortest time is set as the power plan setting value TDIM of the display brightness reduction mode, and thus the MPU 11 sets as follows.

TMIN=TDIM

Similarly, in the example illustrated in FIG. 3B, the shortest time is set as the power plan setting value TSLP of the information processing device sleep mode, and thus the MPU 11 sets as follows.

TMIN=TSLP

Figure 4:
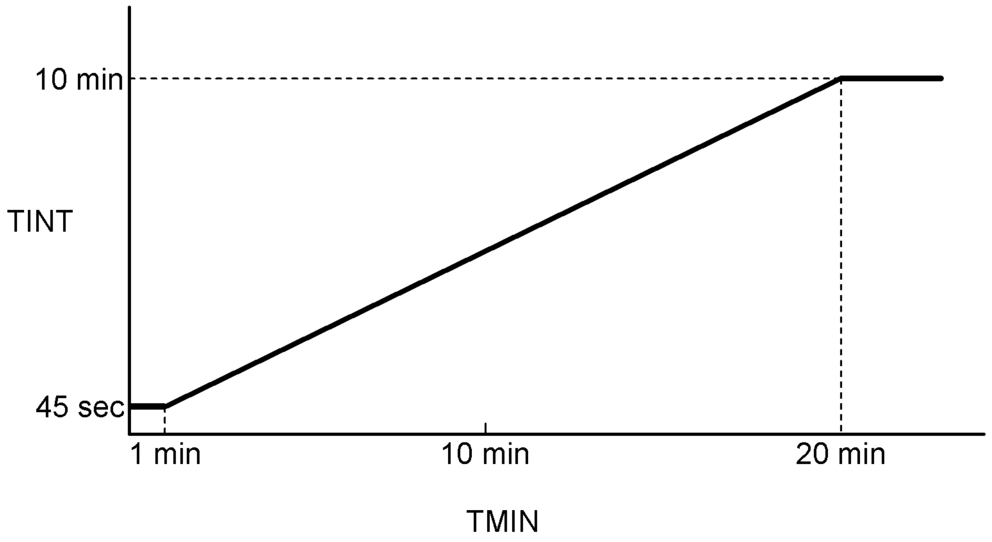
FIG. 4 is an exemplary explanatory diagram schematically illustrating a determination method of a face detection interval.

FIG. 4 is a diagram schematically illustrating a determination method of a face detection interval.

Subsequently, the MPU 11 determines in which value range a power plan setting value set as the shortest time is, among a range from 1 minute or shorter, a range exceeding 1 minute until 20 minutes including the same, or a range from 20 minutes or longer.

When a power plan setting value set as the shortest setting time is in a range from 1 minute or shorter, the MPU 11 sets "face detection interval time TINT=45 seconds".

When a power plan setting value TMIN sets as the shortest setting time is in a range exceeding 1 minute but shorter than 20 minutes, the MPU 11 sets "face detection interval time TINT=TMIN/2 (minutes)".

When a power plan setting value TMIN set as the shortest setting time is in a range from 20 minutes or longer, the MPU 11 sets "face detection interval time TINT=20 (minutes)".

Therefore, in the case illustrated in FIG. 3A, the face detection interval time is as follows.

$$TMIN = TDIM = 2 \text{ minutes, and then}$$
$$TINT = 2/2 = 1 \text{ minute}$$

Similarly, in the case illustrated in FIG. 3B, the face detection interval time is as follows.

TMIN=TDIM=25 minutes, and then

TINT=10

In the following description, the case illustrated in FIG. 3A, that is, the case in which "face detection interval time TINT=1 minute" is determined for the face detection interval timer (internal timer) of the MPU 11 in the presence of a user, and "face detection interval time TINT=2 seconds" is set for display power-off state, is exemplified.

Figure 5:
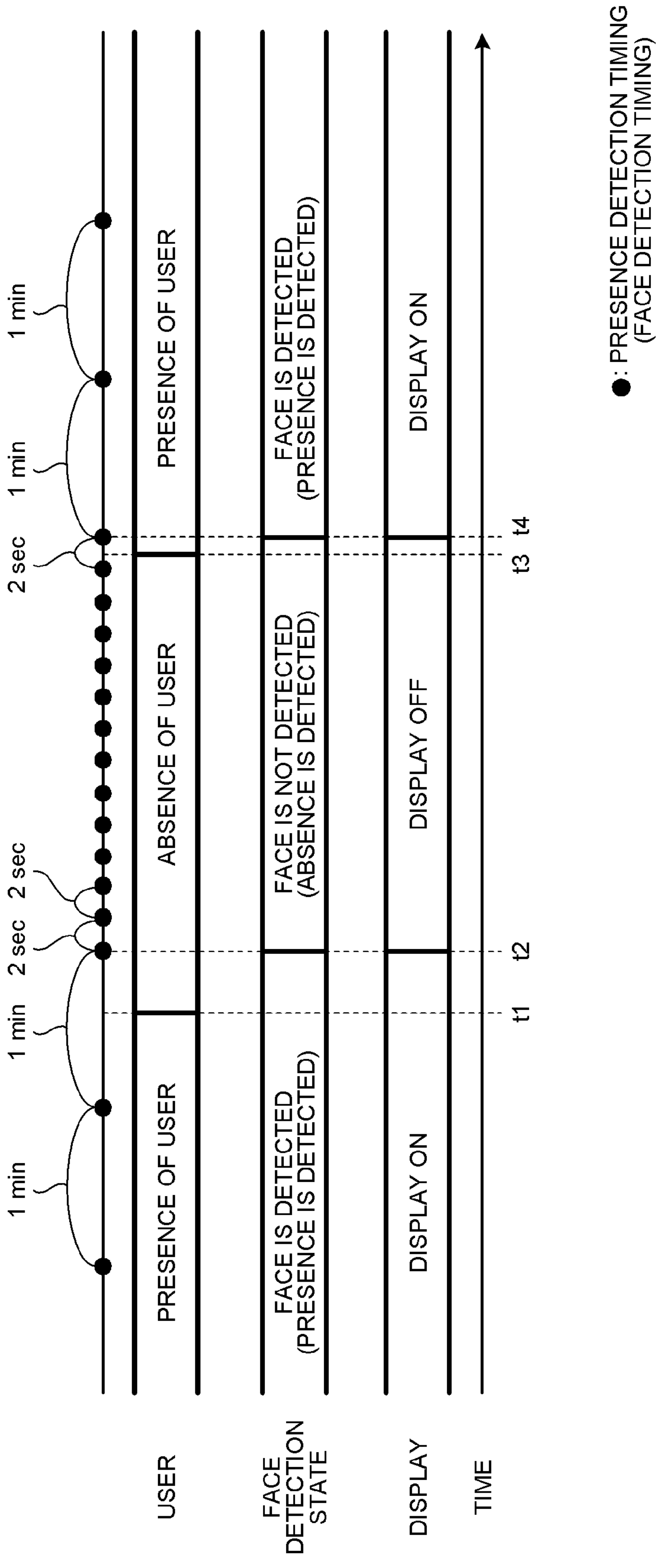
FIG. 5 is an exemplary explanatory diagram illustrating operation in the first embodiment.

FIG. 5 is a diagram illustrating operation in the first embodiment.

The MPU 11 sets "face detection interval time TINT=1 minute" in the face detection interval timer (internal timer), and starts counting (S13).

Subsequently, the MPU 11 determines whether there exists user operation through the operating device 19 (S14).

When it is determined at S14 that no user operation through the operation device 19 exists (No at S14), the MPU 11 determines whether the count of the face detection interval timer has been completed (counted up) (S16).

When it is determined at S16 that the count of the face detection interval timer has not been completed (No at S16), the MPU 11 shifts the processing to S14 again to perform the same processing subsequently.

When it is determined at S16 that the count of the face detection interval timer has been completed (Yes at S16), the MPU 11 activates the camera 18 only for duration required for capturing processing to capture an image and acquire image data, and then turns off the power of the camera 18 again (S17).

Then, the MPU 11 performs face detection processing, i.e., presence detection processing (S18).

Subsequently, the MPU 11 determines whether a face of a user has been detected, that is, whether his/her presence has been detected in the face detection processing at S17 (S19).

When it is determined at S19 that a face of a user, i.e., his/her presence has been detected (Yes at S19), the operating system timer for shifting to an energy saving mode of the operating system (OS) is reset (S21). In this way, it is possible to prevent a situation in which the operating system timer and the face detection interval timer, which are managed by the operating system, are controlled individually in a separated manner, enabling uniform management.

Then, the MPU 11 turns on the power of the display 17 (or maintains its on-state) through the internal I/O 14 (S22).

The MPU 11 shifts the processing to S13 again to repeat the same operation subsequently.

To be more specific, when a user is actually present until time t1, his/her presence is detected until time t2, and thus the power of the display is kept on until then, as illustrated in FIG. 5.

By contrast, when it is determined at S19 that a face of a user is not detected, that is, his/her presence is not detected, his/her absence is detected (No at S18). Thus, the MPU 11 turns off the power of the display 17 through the internal I/O 14 (S20).

Concretely, when the camera is activated at time t2 and face detection (presence detection) processing is performed, a face is not detected because a user is absent, and then the power of the display 17 is turned off.

Here, the power-off state of the display 17 indicates a light-out state in which display is not effectively performed on the display 17. This state includes, in addition to a case in which the power of a display is actually turned off, a case in which a backlight is turned off when a liquid crystal display with a backlight, etc. is used as the display 17, that is, a case in which display is not effectively performed while display control is continued.

Then, the MPU 11 shifts the processing to S13, and since the power of the display 17 is currently off, it sets "face detection interval time TINT=2 seconds" for display power-off state.

Therefore, assuming that the user returns to be seated at time t3, "face detection interval time TINT=2 seconds" is kept until t4 at which the camera is activated for the first time after time t3 to perform face detection (presence detection) processing and the face is detected, as illustrated in FIG. 5.

Therefore, face detection (presence detection) processing is performed within two seconds at most after the user returns.

Then, at t4 at which the camera is activated for the first time after time t3 and face detection (presence detection) processing is performed, the face is detected (Yes at S19). Thus, the MPU 11 resets the operating system timer for shifting to an energy saving mode of the operating system (OS) (S21), and the power of the display is turned on so that the user can use the information processing device (S22).

Then, the MPU 11 shifts the processing to S13 again and resets "face detection interval timer setting value TINT=1 (min)" (S13).

Therefore, as illustrated in FIG. 5, "face detection interval timer setting value TINT=1 minute" is set again after time t4, and the same processing is repeated subsequently.

As described above, in the first embodiment, when a user is present, the face detection processing interval time is set to be longer (1 minute, in the above-described example). Therefore, it is possible to significantly reduce electric power consumption of the camera, compared with a case in which the camera is continually used to perform face detection processing.

When a user is absent, the face detection processing interval time is set to be shorter (2 seconds, in the above-described example). Thus, when the user returns to be present again, it is possible to turn on the display 17 so that the information processing device becomes available, without stressing the user.

Therefore, contradictory demands for electric power saving and user usability can be fulfilled.

[2] Second Embodiment

In the first embodiment described above, the presence detection interval time is set to be shorter when the power of the display 17 is off than when the power of the display 17 is on and the presence of a user is being detected. By contrast, in a second embodiment, after the absence of the user is detected for the first time while the power of the display 17 is on, a predetermined presence confirmation period is arranged. Here, the presence detection interval time during the presence confirmation period is set to be shorter than presence interval time immediately before the absence of the user is detected for the first time.

In addition, in the second embodiment, the presence detection interval time during presence confirmation period is set to be equal to or shorter than the presence detection interval time when the power of the display 17 is off.

In the following description, the presence detection interval time during presence confirmation period is set to be 1 second, and the presence detection interval time when the power of the display 17 is off is set to be 2 seconds, for example.

In the second embodiment, the device configuration is the same as in the first embodiment. Thus, FIG. 1 is incorporated.

Figure 6:
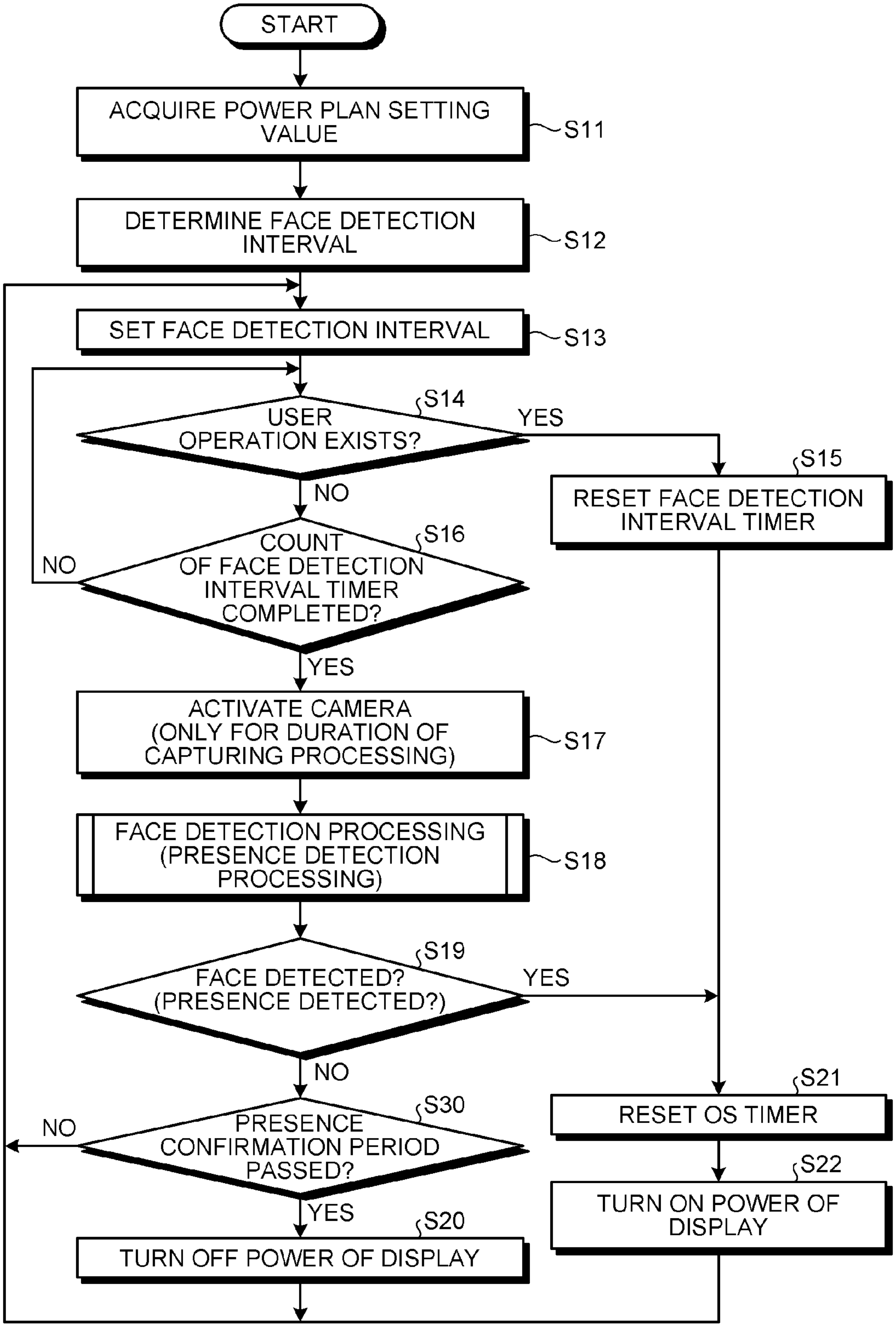
FIG. 6 is an exemplary flowchart illustrating operation processing according to a second embodiment.

FIG. 6 is a flowchart illustrating operation processing according to the second embodiment. In FIG. 6, the parts same as in FIG. 2 are provided with the same symbols.

Figure 7:
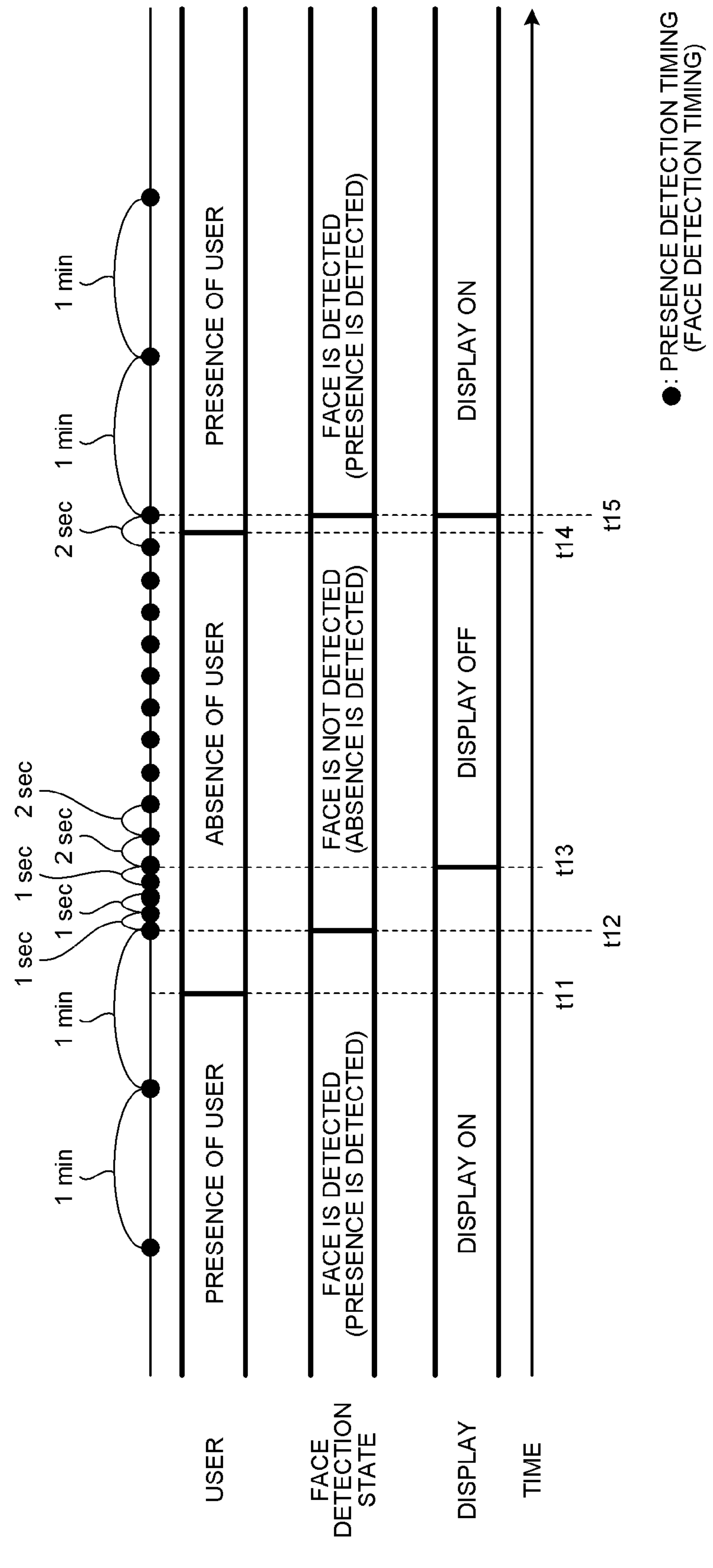
FIG. 7 is an exemplary explanatory diagram illustrating operation in the second embodiment.

FIG. 7 is a diagram illustrating operation in the second embodiment.

First, the MPU 11 of the information processing device 10 acquires power plan setting values with reference to power plan setting data of the operating system (OS) (S11).

Then, the MPU 11 specifies, based on the power plan setting value TDIM, the power plan setting value TOFF, the power plan setting value TSLP, and the power plan setting value TSTP that are obtained at S11, a power plan setting value TMIN set as the shortest time among these power plan setting values, and determines face detection interval time (S12).

Subsequently, the MPU 11 sets "face detection interval time TINT=1 minute" in the face detection interval timer (internal timer), and starts counting (S13).

Then, the MPU 11 determines whether there exists user operation through the operating device 19 (S14).

When it is determined at S14 that no user operation through the operation device 19 exists (No at S14), the MPU 11 determines whether the count of the face detection interval timer has been completed (counted up) (S16).

When it is determined at S16 that the count of the face detection interval timer has not been completed (No at S16), the MPU 11 shifts the processing to S14 again to perform the same processing.

When it is determined at S16 that the count of the face detection interval timer has been completed (Yes at S16), the MPU 11 activates the camera 18 only for duration required for capturing processing to capture an image and acquire image data, and then turns off the power of the camera 18 again (S17).

Then, the MPU 11 performs face detection processing, i.e., presence detection processing (S18).

Subsequently, the MPU 11 determines whether a face of a user has been detected, that is, whether his/her presence has been detected in the face detection processing at S17 (S19).

When it is determined at S19 that a face of a user, i.e., his/her presence has been detected (Yes at S19), the operating system timer for shifting to an energy saving mode of the operating system (OS) is reset (S21).

Then, the MPU 11 turns on the power of the display 17 (or maintains its on-state) through the internal I/O 14 (S22).

The MPU 11 shifts the processing to S13 again to repeat the same operation subsequently.

To be more specific, when a user is actually present until time t11, his/her presence is detected until time t12, and thus the power of the display 17 is kept on until then, as illustrated in FIG. 6.

By contrast, when it is determined at S19 that a face of a user is not detected, that is, his/her presence is not detected, his/her absence is detected (No at S19). Thus, the MPU 11 determines whether a presence confirmation period (4 seconds, in the second embodiment) has passed (S30).

When it is determined at S30 that the presence confirmation period (4 seconds, in the second embodiment) has not passed, the MPU 11 sets "face detection interval time TINT=1 second" corresponding to the presence confirmation period in the face detection interval timer (internal timer), and starts counting (S13).

Therefore, the face detection (presence detection) processing for determining whether a user is present is performed every one second until time t13 at which the presence confirmation period is finished.

When the presence of a user is not detected until t13 at which the presence confirmation period is finished, it is determined at S30 that the presence confirmation period (4 seconds, in the second embodiment) has passed at t13 (Yes at S30). Thus, the MPU 11 turns off the power of the display 17 through the internal I/O 14 (S19).

Concretely, when the camera is activated at time t13 and face detection (presence detection) processing is performed, the absence of a user is detected during the entire of presence confirmation period. Thus, a face is not detected, and the power of the display 17 is turned off.

Then, the MPU 11 shifts the processing to S13, and since the power of the display 17 is currently off, it sets "face detection interval time TINT=2 seconds" for display power-off state.

Therefore, assuming that the user returns to be seated at time t14, "face detection interval time TINT=2 seconds" is kept until t15 at which the camera is activated for the first time after time t14 to perform face detection (presence detection) processing and the face is detected, as illustrated in FIG. 6.

Therefore, also in the second embodiment, face detection (presence detection) processing is performed within two seconds at most after the user returns.

Then, at t15 at which the camera is activated for the first time after time t14 and face detection (presence detection) processing is performed, the face is detected (Yes at S19). Thus, the MPU 11 resets the operating system timer for shifting to an energy saving mode of the operating system (OS) (S21), and the power of the display is turned on so that the user can use the information processing device (S22).

Then, the MPU 11 shifts the processing to S13 again and resets "face detection interval timer setting value TINT=1 (min)" (S13).

Therefore, as illustrated in FIG. 16, "face detection interval timer setting value TINT=1 minute" is set again after time t15, and the same processing is repeated subsequently.

As described above, in the second embodiment, when a user is present, the face detection processing interval time is set to be longer (1 minute, in the above-described example), and the period immediately after the user leaves is arranged as a presence confirmation period. Therefore, it is possible to detect certainly that the user has left and prevent deterioration of user usability due to false detection.

In addition, it is possible to significantly reduce electric power consumption of the camera, compared with a case in which the camera is continually used to perform face detection processing.

When a user is absent, the face detection processing interval time is set to be shorter (2 seconds, in the above-described example). Thus, when the user returns to be present again, it is possible to turn on the display 17 so that the information processing device becomes available, without stressing the user.

Therefore, also in the second embodiment, contradictory demands for electric power saving and user usability can be fulfilled.

Figure 8:
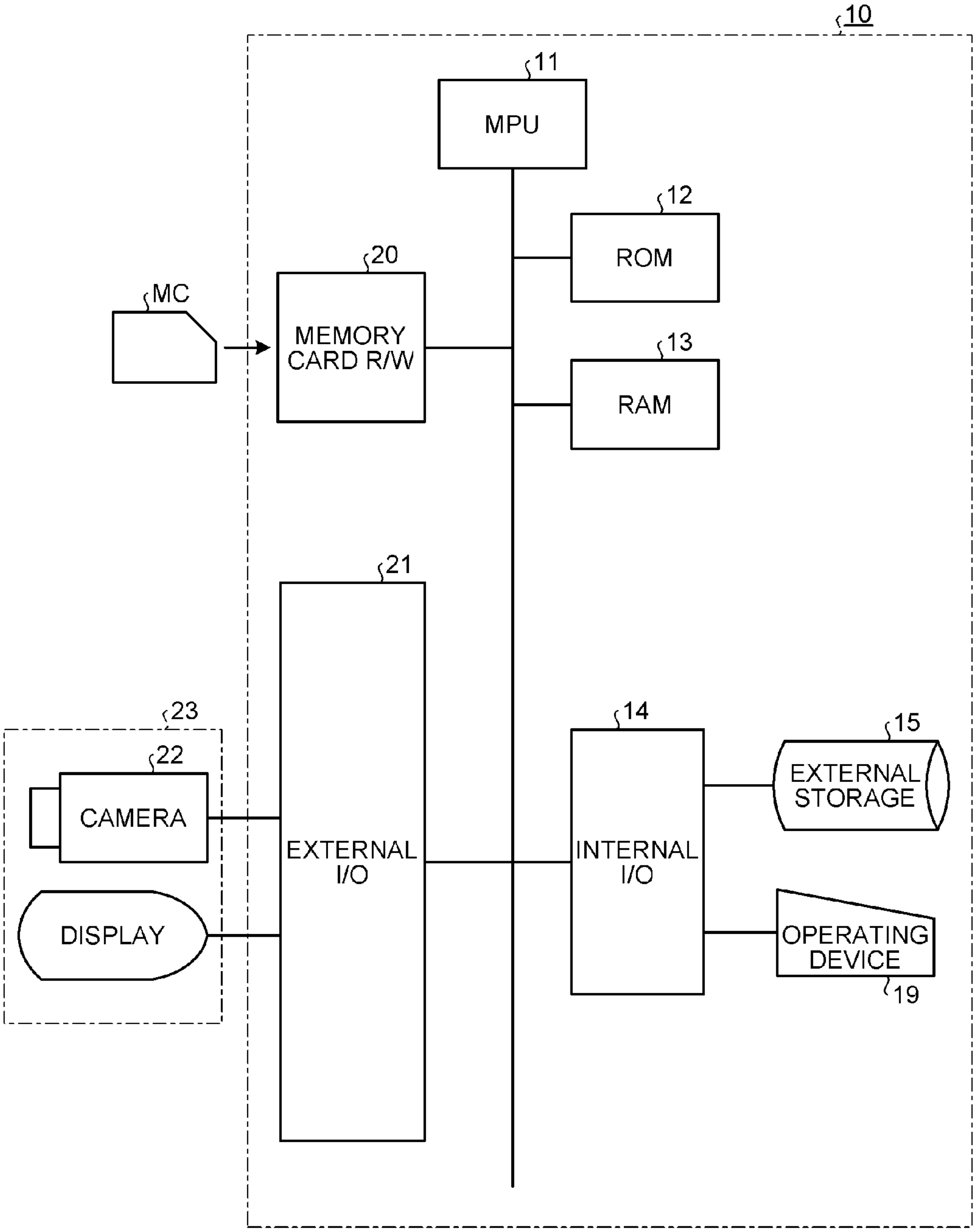
FIG. 8 is an exemplary block diagram illustrating a schematic configuration of an information processing device in a modified example of the embodiment.

FIG. 8 is a block diagram illustrating a schematic configuration of an information processing device in a modified example of the embodiment.

In the above description of the embodiments, as the information processing device 10, a camera-equipped laptop personal computer in which the display 17 and the camera 18 are integrally stored in the display panel portion 16 of the information processing device 10 is used. However, an information processing device 10A in the modified example of the first embodiment is constituted as a desktop personal computer in which an external I/O (input/output portion) 21 performing various kinds of interface operation with respect to external apparatuses is provided, instead of the display panel portion 16 integrally storing therein the display 17 and the camera 18, and an external display 23 integrally storing therein a camera 22 is connected through the external I/O 21.

Also in the modified example of the embodiment, which has the configuration described above, it is possible to reduce electric power consumption while performing presence detection processing (presence detection application) correctly.

In the above description, the information processing device (computer) is exemplified as an electric apparatus. However, any electric apparatus can be applied in the same manner as long as it uses a display device such as a television device or a video recording device.

In the above description, the display 17 and the camera 18 are integrally stored. However, when a display (or an external display) is provided as the display 17 arranged individually from the camera 18, it is also possible to configure such that the action to turn off the power of the display is prohibited.

With this configuration, it is possible to prevent a case in which the display is turned off carelessly when a profile, etc. of a user is captured, and the face cannot be detected and the presence of the user cannot be detected.

In the above description, after the presence of a user is not detected and the power of the display is turned off, certain face detection interval time is arranged until the presence of the user is detected again. However, it is also possible to configure such that face detection is performed continuously without arranging any face detection interval time.

In the above, a case in which the power plan setting value is updated is not described. However, when the power plan setting value is updated, setting time in the face detection interval timer is also updated. Thus, a setting value in the face detection interval timer is always set to be shorter than a shortest value of a power plan setting value, which ensures energy saving.

A control program of the electronic apparatus in the embodiments may be preliminarily stored in a ROM, etc., and then provided.

The control program executed in the electronic apparatus in the embodiments may be recorded, as a file whose format is installable or executable, in a computer-readable recording medium such as a compact disc read only memory (CD-ROM), a flexible disk (FD), a CD recordable (CD-R), a digital versatile disk (DVD) or a memory card, and then provided.

The control program executed in the electronic apparatus in the embodiments may be stored in a computer connected to a network such as the Internet, and then provided through download thereof through the network. Alternatively, the control program executed in the electronic apparatus in the embodiments may be provided or distributed through a network such as the Internet.

The control program executed in the electronic apparatus in the embodiments has module configuration including modules (a display controller, a presence determining module, a reference elapsed time storage module, an interval time setting module, and a power controller) as described above. As actual hardware, the CPU (processor) reads out the control program from the ROM and executes it, so that each module mentioned above is loaded to a main memory and the display controller, the presence determining module, the reference elapsed time storage module, the interval time setting module, and the power controller are generated in the main memory.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:

a presence determining module configured to determine, at a plurality of intervals, whether a user is present based on image data output by a camera;

a display power controller configured to turn on a display when the user is present and to turn off the display when the user is not present, based on a result of the presence determining module; and a detection interval controller configured to control the intervals so that a first interval of the intervals during when the display is off becomes shorter than a second interval of the intervals during when the display is on, wherein the detection interval controller is configured to set a presence confirmation period after the user is determined not to be present for a first time while the display is on, and to control the intervals so that a third interval of the intervals during the presence confirmation period becomes shorter than the first interval.

2. The electronic apparatus of claim 1, wherein the detection interval controller is configured to control the intervals with preliminary reference to an electric power saving mode shifting setting for shifting to an electric power saving mode.

3. The electronic apparatus of claim 1, wherein the display power controller is configured to prohibit an action to turn off the display when the display is separate from the camera.

4. An electronic apparatus controlling method executed in an electronic apparatus displaying various kinds of information on a display device, the electronic apparatus controlling method comprising:

determining, at a plurality of intervals, whether a user is present based on image data obtained by a camera;

controlling power to turn on a display when the user is present and to turn off the display when the user is not present, based on a result of the determining; and controlling the intervals so that a first interval of the intervals during when the display is off becomes shorter than a second interval of the intervals during when the display is on, wherein the controlling the interval comprises:

setting a presence confirmation period after the user is determined not to be present for a first time while the display is on; and controlling the interval intervals so that a third interval of the intervals during the presence confirmation period becomes shorter than the first interval.

5. A computer program product having a nontransitory computer readable medium including programmed instructions, wherein the instructions, when executed by a computer, cause the computer to perform:

determining at a plurality of intervals, whether a user is present based on image data output by a camera;

controlling power to turn on a display when the user is present and to turn off the display when the user is not present, based on a result of the determining; and controlling the intervals so that a first interval of the intervals during when the display is off becomes shorter than a second interval of the intervals during when the display is on, wherein the controlling the interval comprises:

setting a presence confirmation period after the user is determined not to be present for a first time while the display is on; and controlling the interval intervals so that a third interval of the intervals during the presence confirmation period becomes shorter than the first interval.

* * * * *